(No Model.)

J. GLENNON.
HAMMOCK SUPPORTER.

No. 349,216. Patented Sept. 14, 1886.

WITNESSES:
W. D. Coppernoll
J. J. Rose

INVENTOR
Joseph Glennon
BY William H. Sisson
& Clarence F. Gooding
ATTORNEYS

UNITED STATES PATENT OFFICE.

JOSEPH GLENNON, OF CHICAGO, ILLINOIS.

HAMMOCK-SUPPORTER.

SPECIFICATION forming part of Letters Patent No. 349,216, dated September 14, 1886.

Application filed July 19, 1886. Serial No. 208,495. (No model.)

*To all whom it may concern:*

Be it known that I, JOSEPH GLENNON, of Chicago, in the county of Cook and State of Illinois, have invented a new and Improved Hammock-Supporter, a full and complete description of which is set forth in the following specification, reference being had to the accompanying drawings.

The object of my invention is to provide a hammock-supporter light, simple, and strong in construction, easily taken apart for transportation, and readily put together and adjusted to any desired height or length without tools or delay.

Figure 1:
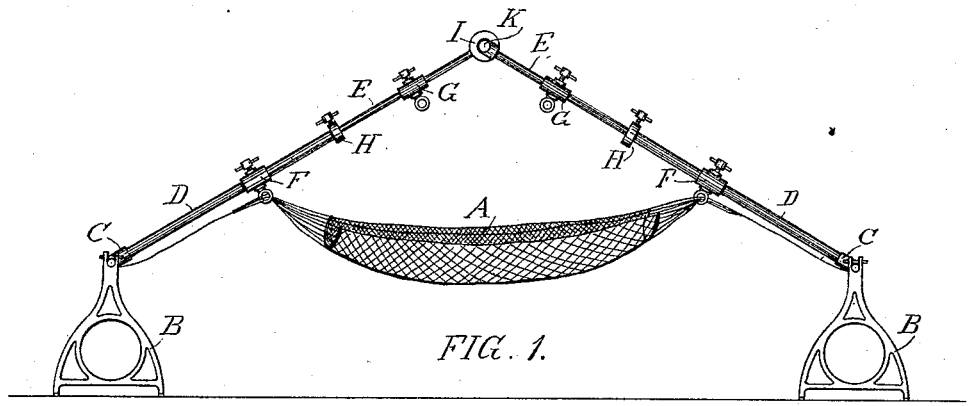
Figure 2:
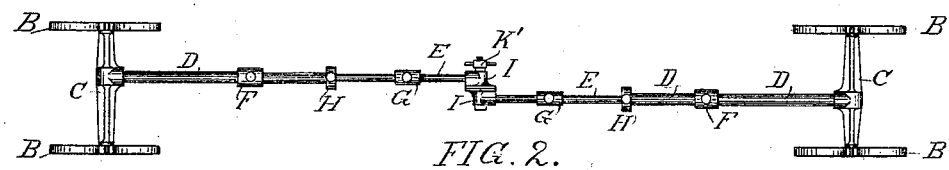
Figure 3:
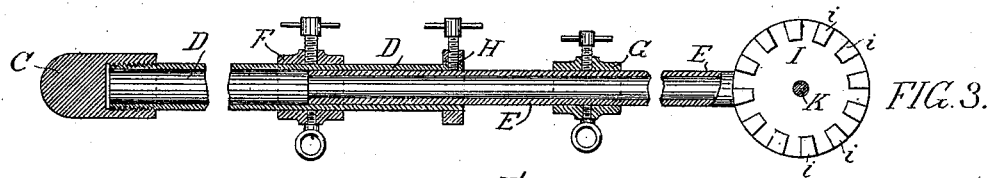
Figure 4:
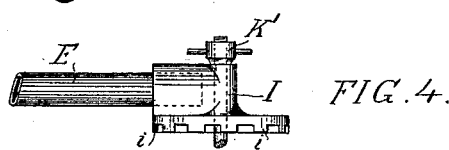
Figure 5:
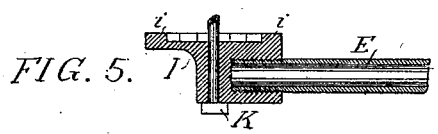

Referring to the drawings, Figure 1 shows the hammock-supporter with hammock supported thereon. Fig. 2 is a top view of the supporter. Fig. 3 is a vertical sectional view of one of the supporting-rods. Fig. 4 is a top view of the clutch. Fig. 5 is a top sectional view of the same.

Similar letters denote similar parts throughout the drawings.

A, Fig. 1, is a hammock.

B B B B are four end supports or trusses, preferably of metal, to sustain the supporter proper, and may rest directly on the ground, as shown in Fig. 1, or they may be hinged or otherwise secured to the bases of wood or other material, as desired. The apex of each of the end supports is transversely recessed to form a rounded socket for the cross-arms of the supporter proper.

The supporter proper is composed of two similar extensible rods secured together at one end in any desired angle by an adjustable clutch, and each constructed as follows: To a cross-bar, c, provided with bearings on its ends to fit into the sockets of the end supports B is rigidly attached, at a right angle therewith, an arm, D, being a metallic tube of a length equal to more than one-fourth of the extreme desired distance between the opposite ends of the supporter, and provided, near its outer end from said cross-bar, with a binding-screw, H. Within the tube D is fitted a smaller tube, E, telescoping into the tube D, so that it may be secured at any point of extension by the binding-screw H. Upon the outer end of the tube E is secured one part of the clutch I, consisting of a circular plate containing indentations and projections, and a hole through the center, so that when the two parts are put together they will fit closely and will not turn or yield, and may be secured together in any position by a bolt, K, through the holes in said clutch and the nut K' on said bolt. Upon the tube D is fitted the adjustable collar F, provided with an eyebolt, to which is secured the suspending-cord of one end of the hammock, and a binding-screw by which the collar may be secured in any position desired upon the tube. The tube E is provided with a like collar, G, to support the awning or shade.

The cross-arm C being free to move in its sockets, the rods being adjustable in length by the part E telescoping into the part D, and the clutch I being adjustable, to hold the extensible rods together at any desired angle, the distance between the end supports may be increased or decreased as desired, and by means of the adjustable collars F any desired length of hammock may be used.

Having thus described my invention, what I claim, and desire to secure by Letters Patent, is—

1. A hammock-supporter comprising end supports with transverse sockets in their apex to receive movable cross-bars, two extensible rods, each rigidly secured at one end to a cross-bar provided at its ends with bearings to fit into said sockets, said rods being provided with adjustable collars with eyebolts to support the hammock, and an adjustable clutch to hold said rods together at any desired angle, substantially as described, and for the purpose specified.

2. A hammock-supporter comprising end supports B, in combination with extensible rods consisting of the parts D and E, attached to the cross-bars c, the movable collar F, and the clutch I, substantially as shown and described, and for the purpose specified.

3. A hammock-supporter comprising end supports B, in combination with extensible rods consisting of the parts D and E, attached to the cross-bars C, the movable collars F, the binding-screw H, and the clutch I, substantially as shown, and for the purpose specified.

4. A hammock-supporter comprising end supports B, in combination with extensible rods consisting of the parts D and E, attached to the cross-bars C, the movable collars F and G, the binding-screw H, and the clutch I, substantially as shown and described, and for the purpose specified.

JOSEPH GLENNON.

Witnesses:
WM. D. COPPERNOLL,
J. J. ROSE.